May 1, 1956  L. L. KUEMPEL  2,743,589
VEHICLE REFRIGERATING APPARATUS
Filed Dec. 10, 1949  2 Sheets-Sheet 1
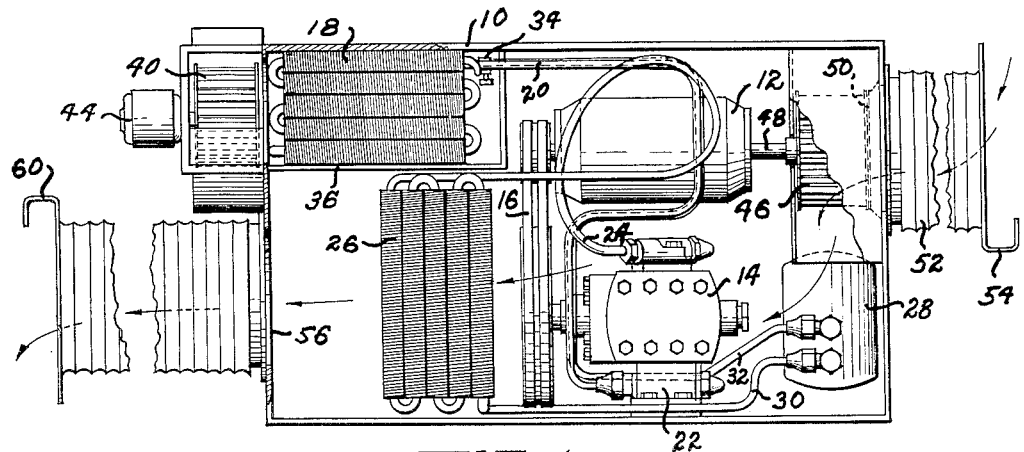
FIG. 1
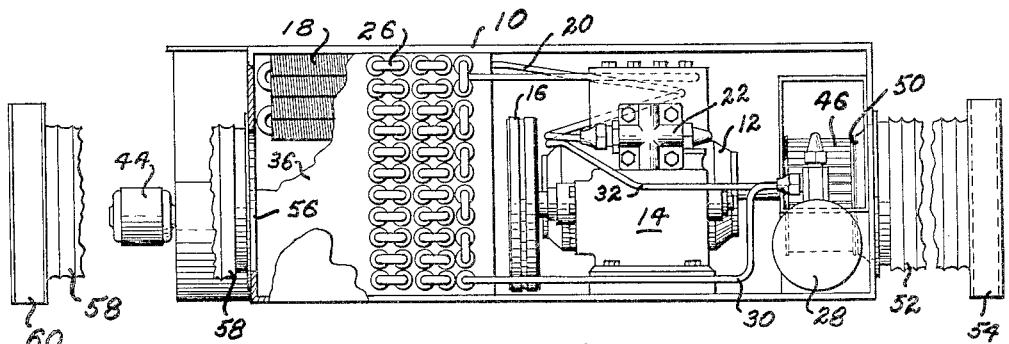
FIG. 2
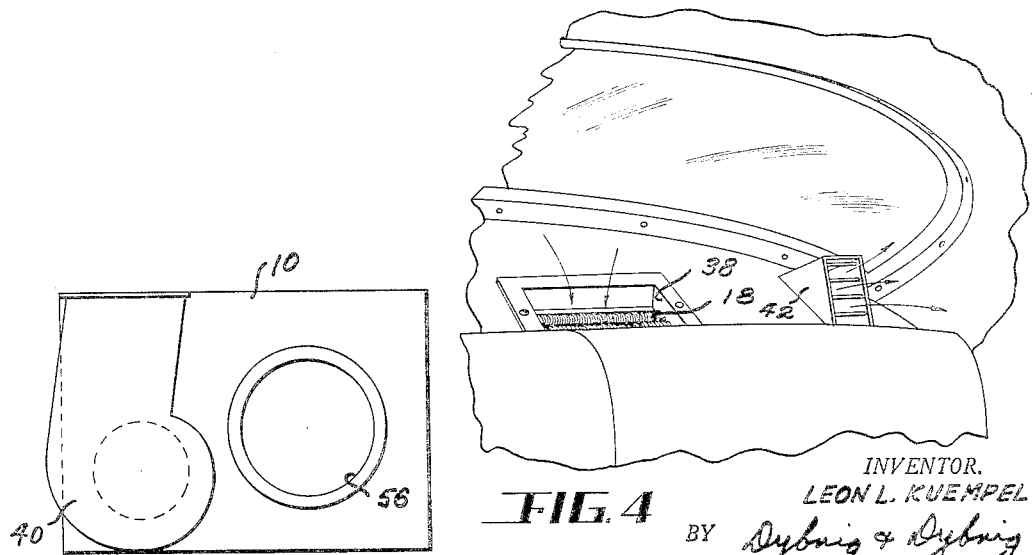
FIG. 3
FIG. 4
INVENTOR.
LEON L. KUEMPEL
BY Dybvig & Dybvig
HIS ATTORNEY May 1, 1956

L. L. KUEMPEL 2,743,589

VEHICLE REFRIGERATING APPARATUS

Filed Dec. 10, 1949

INVENTOR.
LEON L. KUEMPEL
BY Dybvig & Dybvig
HIS ATTORNEY

United States Patent Office 2,743,589
Patented May 1, 1956

2,743,589

VEHICLE REFRIGERATING APPARATUS

Leon L. Kuempel, Cincinnati, Ohio, assignor to Keco Industries, Inc., Cincinnati, Ohio, a corporation of Ohio Application December 10, 1949, Serial No. 132,265

15 Claims. (Cl. 62—117.1)

This invention relates to refrigerating apparatus and more particularly to apparatus of the type used in air conditioning automobiles, refrigerating trucks, and the like.

A large number of arrangements have been devised from time to time for use in air conditioning automobiles and in refrigerating trucks, but these have either been impractical from the standpoint of efficiency and size or have otherwise been objectionable. Many of the problems which are present in the design of air conditioning equipment for mobile units are not present in the design of air conditioning equipment for stationary installations. Thus, in an automobile, for example, the space is at a premium, whereby the use of an auxiliary power plant for operating the air conditioning equipment is almost out of question because of space limitations. Various attempts have been made to eliminate a separate power plant by drivingly connecting the refrigerant compressor directly to the car engine, but due to the wide variations in the engine speed, it is impractical to directly connect the compressor to the car engine and any variable ratio drive mechanism which may be used between the compressor and the car engine adds objectionable complications.

Attempts to use electric motors energized from the usual type of generator or storage batteries have not been too satisfactory because of limitations of any brush type generator and the undesirability of replacing the standard 6 volt electrical equipment furnished on all standard makes of automobiles.

It is an object of this invention to provide an electrical system in which a dual 6 volt system is used in order to obtain a regulated source of 6 volts for the automobile and a regulated source of 12 volts for the air conditioner without the necessity of having an entirely separate 12 volt system.

More particularly, it is an object of this invention to provide a system which eliminates the need for a brush type generator and which utilizes a dual alternator which permits the use of two 6 volt batteries for the combined electrical load of the car accessories as well as the air conditioner.

Another object of this invention is to provide an improved refrigerating system consisting of a self-contained refrigeration unit which uses electrical power generated by an alternator which replaces the conventional generator provided on all standard cars and trucks.

It is another object of this invention to reduce the power requirements by so constructing and arranging the parts that the motion of the car enhances the flow of condenser cooling air so as to reduce the power requirements for operating the refrigeration equipment to a point where a dual 6 volt system is capable of supplying all the power needed.

Another object of this invention is to provide an improved construction and arrangement of parts which make the air conditioning system adaptable to various types of cars.

Other objects and advantages reside in the construction of parts, the combination thereof and the mode of operation, as will become more apparent from the following description.

In the drawings:

Figure 1 is a plan view of the unit with the top wall cut away;

Figure 2 is a side view of the unit;

Figure 3 is an end view of the unit;

Figure 4 is a fragmentary pictorial view showing the parcel shelf immediately at the rear of the back seat with the return air intake and the conditioned air outlet;

Figure 5:
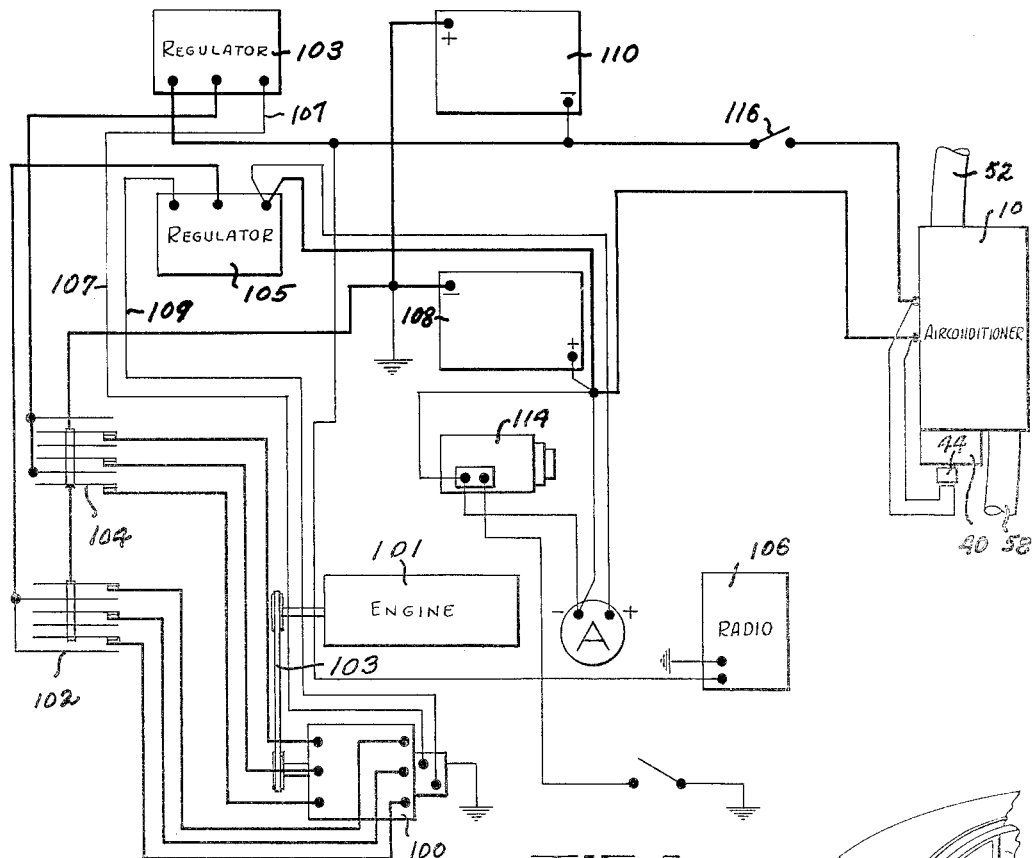
Figure 5 is a schematic wiring diagram.

Referring now to the drawings wherein I have shown a preferred embodiment of my invention as applied to a passenger car for air conditioning purposes, reference numeral 10 designates a casing which is adapted to be supported within the rear luggage compartment of a car directly beneath the parcel shelf. Within the casing 10 there is provided a 12 volt direct current motor 12 which is arranged to drive a refrigerant compressor 14 through a conventional V-belt drive 16. The compressor 14 is adapted to withdraw the vaporized refrigerant from the evaporator 18 through the suction line 20 which leads from the evaporator to the compressor intake 22. The compressed refrigerant is discharged from the compressor through the line 24 which leads to the inlet of the condenser 26. The condensed refrigerant flows from the condenser 26 to the receiver 28 through the line 30. Liquid refrigerant flows from the receiver to the evaporator through the liquid line 32 which is arranged in thermal exchange relationship with the suction line 20, as best shown in Figure 2. The flow of refrigerant to the evaporator is controlled by means of a conventional thermostatic expansion valve 34. The evaporator 18 is partitioned off from the rest of the refrigeration apparatus in the casing 10 by means of the insulating partition 36.

The cabinet 10 is preferably placed directly beneath the parcel shelf which is provided with a return air opening 38 through which air to be conditioned enters the evaporator compartment from the passenger compartment of the car. A centrifugal type of fan 40 is provided for circulating the air to be conditioned through the evaporator compartment. The supply air discharge duct 42 of the fan 40 projects through an opening in the parcel shelf so as to direct the cold air forwardly along the one side of the passenger compartment. A 12 volt direct current motor 44 is provided, as shown, for operating the evaporator fan 40.

Figure 6:
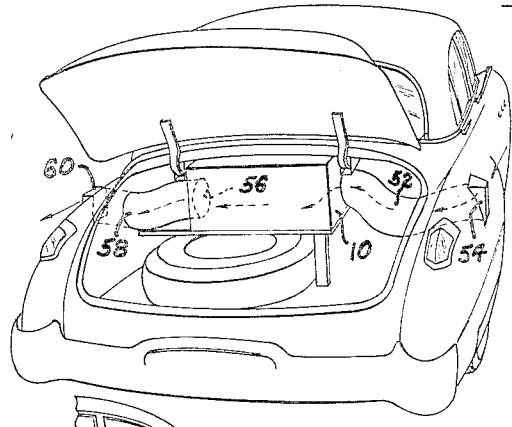
Figure 6 is a pictorial view showing the arrangement of the air conditioning unit within the trunk compartment of a standard make car.
Figure 7:
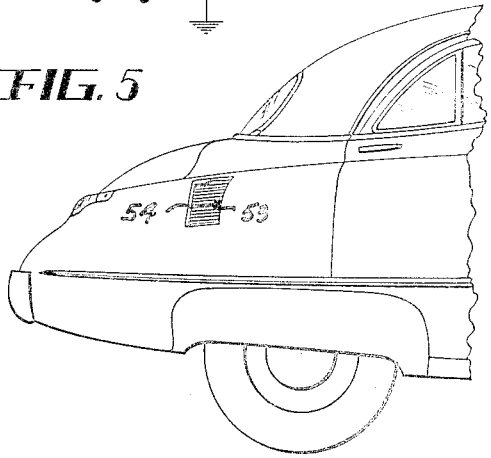
Figures 7 and 8 are fragmentary pictorial views showing the arrangement of the condenser air scoops on the sides of the car.
Figure 8:
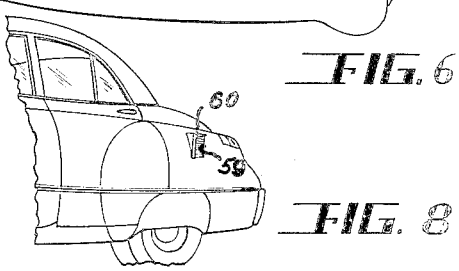

The air for cooling the condenser is circulated through the casing or housing 10 by means of a centrifugal fan 46 mounted directly on the one end of the main shaft 48 of the compressor operating motor 12. Air enters the fan 46 through a side inlet 50 which communicates with a flexible and extensible air duct 52 which leads to an opening 53 in the side wall of the car, as shown. In order to obtain a maximum air flow through the condenser compartment, an air scoop 54 is provided on the side of the car, as best shown in Figure 6, so that the motion of the car in the forward direction serves to scoop air into the condenser cooling air inlet. The condenser cooling air leaves the casing 10 through an outlet opening 56 which likewise communicates with a flexible and extensible air duct 58 which leads to an opening 59 in the opposite side of the car. This outlet opening is provided with an air scoop 60 which is arranged just opposite the air scoop 54 so that movement of the car in the forward direction tends to pull air out from the condenser compartment. The duct 58 could also be arranged to discharge the air directly under the rear fender or through the bottom wall of the trunk compartment.

By virtue of using flexible and extensible air ducts, such as the air ducts 52 and 58, in conjunction with the cabinet 10, the unit may be adapted for mounting on practically any conventional modern car without making any major changes in either the car construction or the construction of the air conditioning apparatus. By taking the condenser cooling air in through an inlet arranged on the curb side, one has the advantage of obtaining air which is cooler than the air under the car or under the fenders. By using scoops, one of which is used to scoop air into the air intake duct and the other of which is arranged to pull air out of the condensed air outlet duct, one obtains a definite advantage both because of using the coolest available air and also because of making maximum use of the differences in air pressure.

Referring now to Figure 5 of the drawings wherein I have shown somewhat schematically the circuit diagram, reference numeral 100 designates a dual alternator which consists of two separate alternators on the same shaft and in the same housing, each furnishing current for its respective 6 volt system. The output of the dual alternator is applied to rectifiers 102 and 104 which rectify the current before it is supplied to the storage battery and other electrical equipment on the car. The alternator 100 is substituted for the conventional direct current generator furnished on standard cars and is driven by the main car engine 101 by means of the belt 103.

The electrical system comprises two 6 volt batteries which have been designated by reference numerals 108 and 110. The battery 108 represents the conventional battery which is furnished on every car, whereas the battery 110 has been added. This electrical system furnishes all of the 6 volt electricity required by the automobile and its accessories and also furnishes the 12 volt current required by the air conditioning apparatus. The 6 volts for the automobile is obtained in the customary manner from the original equipment battery 108, whereas the 12 volts for the air conditioning equipment is obtained from the original equipment battery 108 plus the added battery 110. The nominal output of each of the alternators is 80 to 90 amperes at 6 to 7 volts. The two alternators together have a combined capacity of 80 to 90 amperes at 12 to 14 volts. The operation of the system insofar as regulation is concerned is quite similar to the conventional automobile type system, in that voltage output is rectified and controlled from the direct current side by the usual type of voltage regulators 103 and 105 which supply current for exciting the alternators through the lines 107 and 109 respectively. Frequency changes which occur as a result of car engine speed changes makes no difference, since the output of the alternators is rectified. This necessary electrical power is available at alternator speeds of 1500 R. P. M. and up. The belt ratio used in driving the alternator from the main car engine is such that this corresponds to road speeds of approximately 15 M. P. H. and up, depending upon the particular automobile and the type of automatic transmission, if any. The air conditioning apparatus requires approximately 60 to 70 amperes in normal operation, thereby leaving approximately 20 amperes on each of the 6 volt systems which are available for operation of the automobile and its regular accessories. This load is balanced by connecting the radio 106 and additional electrical accessories, such as spotlights and fog lamps (not shown), to the second battery 110, leaving such items as the ignition, headlights, horns (not shown), starter 114, et cetera, on the first battery 108.

It will be noted that the positive side of battery 110 is grounded, whereas the negative side of the battery 108 is grounded. It will also be noted that the radio is connected to the negative terminal of battery 110, whereas the starter 114 is connected to the positive side of the battery 108. By thus connecting the batteries, the air conditioning equipment can be operated on 12 volts by connecting the power lines leading to the air conditioning equipment to the negative side of the battery 110 and the positive side of the battery 108.

A manually operated switch 116 is provided for turning on and off the air conditioner as required. When the car engine is not in operation, all of the current for operating the air conditioning equipment is furnished by the batteries. When it is desired to operate the air conditioning equipment for a prolonged period of time when the car is not in motion, one should run the engine so as to generate the necessary electrical power for operating the air conditioning apparatus and thereby avoid discharging the battery.

In order to save on the amount of air conditioning required within the car, it is contemplated that the car should be equipped with heat absorbing safety glass in place of the standard equipment safety glass and should be provided with reflective or other efficient insulation for the top, sides, rear, bottom and firewall, plus any other means conducive to reduction of heat transfer from the outside of the car to the inside. The heating controls on those cars provided with automatically controlled heating systems should preferably be in the off position, so that these will not buck the cooling effect of the refrigerating apparatus. However, it is contemplated that the heating equipment can be used to modulate the temperature in the conditioned space when there is excess cooling capacity, so as to eliminate the need for turning the air conditioning apparatus on and off.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination with an automobile having a main body divided into a passenger compartment; an engine compartment and a baggage compartment and having a wall portion for separating the passenger compartment from the baggage compartment; said wall portion having openings therein; said baggage compartment having openings formed in the walls thereof; air conditioning apparatus disposed within said baggage compartment adjacent said wall portion; said apparatus having air inlet and air outlet openings arranged substantially in alignment with the openings in said wall portion; said air conditioning apparatus comprising a compressor, a condenser, an evaporator, a compressor motor for operating said compressor, refrigerant flow connections between said evaporator, compressor and condenser, a condenser compartment, and flexible ducts projecting from said condenser compartment and connected to said openings in the walls of said baggage compartment for directing condenser cooling air through the condenser compartment; said automobile having an engine within said engine compartment for supplying power for propelling said automobile; an alternator within said engine compartment; torque transmitting means between said alternator and said engine; a rectifier for rectifying the current generated by said alternator; and conductors for supplying the rectified current to said compressor motor.

2. In a refrigerating system for use in a mobile unit having a variable speed engine for propelling the unit; a self-contained air cooling unit comprising an evaporator, a condenser, a compressor, refrigerant flow connections between said evaporator, condenser and compressor, a first direct current motor, means for drivingly connecting said first named direct current motor to said compressor, blower means circulating cooling air over said condenser, means for drivingly connecting said blower means to said first named direct current motor, means including a fan for circulating air to be cooled in thermal exchange with said evaporator, a second direct current motor for operating said fan, a housing for enclosing said condenser, compressor and said first named direct current motor, said housing having an air inlet in one end wall thereof and having an air outlet in its opposite end wall, an air scoop in the side of said mobile unit, and means including a flexible duct for connecting said air inlet to said air scoop whereby air is fed into said inlet at a pressure in excess of the pressure at the outlet; and a generating system for supplying power to said air cooling unit comprising a pair of alternators, means for drivingly connecting said alternators to said engine, a pair of rectifiers for rectifying the current generated by said alternators, there being one rectifier for each alternator, means for regulating the output of said alternators so as to compensate for changes in the speed of said engine, and means for supplying said rectified current from both of said alternators to said first named motor and for supplying rectified current only from one alternator to the second named direct current motor.

3. In combination, an automobile having a passenger compartment and a baggage compartment and having a substantially horizontally disposed shelf adjacent the rear of the passenger compartment separating the passenger compartment from the baggage compartment, a self-contained air conditioning unit including a housing disposed within said baggage compartment substantially directly beneath said shelf, said air conditioning unit comprising a condenser, a compressor and an evaporator disposed within said housing, refrigerant flow connections between said evaporator, compressor and condenser, a motor for operating said compressor, said baggage compartment having an air inlet opening and an air outlet opening arranged on opposite sides thereof, said housing having an air inlet opening and an outlet opening arranged at the opposite ends thereof, a flexible duct for connecting said air inlet openings, a flexible duct for connecting said air outlet openings, said shelf and said housing having a first pair of aligned openings constituting return air inlets and a second pair of aligned openings constituting supply air outlets, and a fan for withdrawing air from the passenger compartment through said return air inlets and for circulating the air over the evaporator and then discharging the air cooled thereby through said supply air outlets.

4. In combination, an automobile having a passenger compartment and a baggage compartment and having a substantially horizontally disposed shelf adjacent the rear of the passenger compartment separating the passenger compartment from the baggage compartment, a self-contained air conditioning unit including a housing disposed within said baggage compartment substantially directly beneath said shelf, said air conditioning unit comprising a condenser, a compressor and an evaporator disposed within said housing, refrigerant flow connections between said evaporator, compressor and condenser, a motor for operating said compressor, said baggage compartment having an air inlet opening and an air outlet opening arranged on opposite sides thereof, said housing having an air inlet opening and an air outlet opening arranged at the opposite ends thereof, a flexible duct for connecting said first and second named air inlet openings, a flexible duct for connecting said first and second named air outlet openings, a first vane projecting outwardly from one side of said automobile for scooping outside air in through said air inlet openings, a second vane for enhancing the flow of air through said air outlets, said shelf and said housing having a first pair of aligned openings constituting return air inlets and a second pair of aligned openings constituting supply air outlets, and a fan for withdrawing air from the passenger compartment through said return air inlets and for circulating the air over the evaporator and for discharging the air cooled thereby through said supply air outlets.

5. In a refrigerating system for use in a mobile unit, a self-contained refrigerating system including a cabinet, a compressor mounted within said cabinet, a motor for operating said compressor mounted within said cabinet and drivingly connected to said compressor, a condenser within said cabinet, an evaporator, refrigerant flow connections between said compressor, condenser and evaporator, said cabinet having an air inlet opening and an air outlet opening, a blower within said cabinet driven by said motor, said blower having its inlet side connected to said air inlet opening and having its discharge side arranged to discharge air in thermal exchange with said condenser, a first flexible conduit connected to said air inlet opening, a scoop for drawing outside air into said conduit so as to deliver the air to said air inlet opening of said cabinet at a pressure in excess of atmospheric pressure, and a second flexible conduit connected to said said air outlet opening for discharging the heated air leaving said cabinet into the outside atmosphere.

6. In an air conditioning unit for use in conditioning the air for the passenger compartment of an automobile having an engine for propelling the automobile, a pair of relatively low voltage alternators, means for drivingly connecting said alternators to said engine so as to be operated thereby, a pair of separate rectifiers one for each alternator for rectifying the output of each of said alternators, a pair of separate storage batteries connected to the output of each of said alternators, a pair of separate regulators for regulating the output of said alternators, air conditioning apparatus including a relatively high voltage direct current motor, means for connecting said direct current motor across both of said batteries so as to be supplied with current at a voltage equal to the sum of the individual battery voltages, a plurality of power consuming units, and means for connecting the power consuming units to said storage batteries including means for connecting a portion of said power consuming units to one of said storage batteries and another portion of said power consuming units to the other of said storage batteries.

7. In an air conditioning unit for use in conditioning the air for the passenger compartment of an automobile having an engine for propelling the automobile, a pair of low voltage generators, the armatures of said generators being mounted upon and driven by a common shaft, means for drivingly connecting said shaft to said engine so as to be operated thereby, a pair of separate rectifiers, one for rectifying the output of one of said alternators, the other rectifier for rectifying the output of the other alternator, separate storage batteries connected to the output of each of said alternators, a pair of separate regulators for regulating the output of said alternators, apparatus for cooling air for said passenger compartment including a direct current motor, and means for electrically connecting said direct current motor across said storage batteries.

8. In an air conditioning unit for use in an automobile or the like, an evaporator, a condenser, a compressor, refrigerant flow connections between said evaporator, condenser and compressor, a direct current motor for operating said compressor, a variable speed power unit, a pair of alternators driven by said variable speed power unit for generating alternating current, a pair of rectifiers for rectifying the alternating current generated by said alternators, regulators for regulating the excitation of said alternators, means for connecting the output of said rectifiers in series so as to obtain a source of power having a voltage equal to the sum of the voltages of said alternators, and means for supplying said rectified current to said direct current motor.

9. Refrigerating apparatus comprising in combination, an evaporator, a condenser, a compressor, refrigerant flow connections between said evaporator, condenser and compressor, an electric motor for operating said compressor, a variable speed power unit, a pair of separate alternators driven by said variable speed power unit for generating alternating current power, a pair of rectifiers for rectifying said alternating current power, a pair of regulators for regulating field excitation of said alternators, a first storage battery connected to one of said alternators, means for grounding the negative side of said first battery, a second battery connected to the second of said alternators, means for grounding the positive side of said second battery, means for connecting the negative side of said first battery to the positive side of said second battery, power lines connecting said electric motor to said batteries and to said rectifiers so as to supply rectified current to said motor, including a first line connecting said motor to the negative side of said second battery and a second line for connecting said motor to the positive side of the first battery.

10. Refrigerating apparatus comprising in combination, an evaporator, a condenser, a compressor, refrigerant flow connections between said evaporator, condenser and compressor, an electric motor for operating said compressor, a variable speed power unit, a pair of alternators driven by said variable speed power unit for generating alternating current power, a pair of rectifiers for rectifying said alternating current power, a pair of regulators for regulating field excitation of said alternators, a first storage battery connected to one of said alternators, means for grounding one side of said first battery, a second battery connected to the second of said alternators, said batteries being connected in series, power lines connecting said first battery to a lower voltage load, and power lines connecting both batteries to said motor.

11. In an automobile having a plurality of direct current power consuming units thereon at least one of which is a relatively high voltage unit designed to operate at approximately twice the voltage of others thereof, a pair of separate alternators for generating alternating current power, rectifiers for rectifying said alternating current power, regulators for controlling the field excitation of said alternators, a first storage battery connected to receive the output of one of said alternators, a second battery connected to receive the output of the second of said alternators, the negative side of said first battery being connected to the positive side of said second battery, conductors for connecting said relatively high voltage power consuming unit across both of said batteries, and conductors for connecting said relatively low voltage units across one of said batteries.

12. In a system for use in a mobile unit, a variable speed power unit, a pair of alternators driven by said variable speed power unit for generating alternating current, a pair of rectifiers for rectifying the alternating current generated by said alternators, regulators for controlling the excitation of said alternators, first power consuming means operable at a given voltage corresponding to the voltage output of one of said alternators, relatively high voltage power consuming means, conductors for connecting said first power consuming means across the output of one of said alternators, and conductors for connecting said relatively high voltage power consuming means to the output of both of said alternators.

13. In a system for use in a mobile unit, a variable speed power unit, a pair of alternators driven by said variable speed power unit for generating alternating current, a pair of rectifiers for rectifying the alternating current generated by said alternators, regulators for controlling the excitation of said alternators, first power consuming means operable at a given voltage corresponding to the voltage output of one of said alternators, relatively high voltage power consuming means, conductors for connecting said first power consuming means across the output of one of said alternators, conductors for connecting said relatively high voltage power consuming means to the output of both of said alternators, and storage batteries connected to the output side of said rectifiers for providing standby power for operating at least some of said power consuming units when said alternators are not in operation.

14. In an electrical system for a mobile vehicle having power consuming units utilizing a comparatively low voltage and at least another power consuming unit utilizing a higher voltage, said mobile vehicle having a variable speed prime mover, said electrical system including a pair of alternators each provided with a rotor, a shaft upon which the rotors are fixedly mounted, means for driving the shaft from the prime mover, a pair of storage batteries connected in series, some of the low voltage consuming units being connected across one of the batteries and the power consuming unit utilizing higher voltage being connected across both batteries, there being one battery for each alternator, means for connecting the output of one of the alternators to one of the batteries, and means for connecting the output of the other alternator to the other battery, each of said connecting means including a rectifier unit and a voltage regulator unit, the rectifier unit rectifying the current supplied to the battery and the voltage regulator unit regulating the voltage output of the alternator to thereby charge the batteries with a substantially constant D. C. voltage so as to maintain both batteries fully charged irrespective of varying load requirements of the two batteries.

15. A refrigerating apparatus for a motor vehicle of the type having a refrigerating compartment comprising an alternator arranged to be driven by the engine of the vehicle, a rectifier connected with the output side of said alternator, a refrigerating apparatus on said vehicle, a direct current motor for operating said refrigerating apparatus, said motor being connected with said rectifier for operation by said alternator, a first battery connected with said rectifier and said refrigerating apparatus motor, said vehicle including an ignition and a lighting circuit connected with said rectifier, and a second battery connected with said rectifier and said ignition and lighting circuits, said batteries each being arranged to be charged by the current supplied by said alternator.

References Cited in the file of this patent

UNITED STATES PATENTS

| | | |
|---|---|---|
| 1,814,315 | Koch | July 14, 1931 |
| 1,985,641 | Krapf et al. | Dec. 25, 1934 |
| 1,998,443 | Carpenter | Apr. 23, 1935 |
| 2,089,512 | Upp | Aug. 10, 1937 |
| 2,091,594 | Innes | Aug. 31, 1937 |
| 2,106,637 | Hauser | Jan. 25, 1938 |
| 2,115,472 | Sargent | Apr. 26, 1938 |
| 2,117,018 | Conrad et al. | May 10, 1938 |
| 2,117,141 | Breer et al. | May 10, 1938 |
| 2,127,993 | Crawford | Aug. 23, 1938 |
| 2,170,546 | Candor et al. | Aug. 22, 1939 |
| 2,213,337 | Conlon | Sept. 3, 1940 |
| 2,339,903 | Alexander | Jan. 25, 1944 |
| 2,432,084 | Blair | Dec. 9, 1947 |
| 2,494,749 | Fagen et al. | Jan. 17, 1950 |
| 2,506,809 | Nims | May 9, 1950 |
| 2,557,298 | Leece | June 19, 1951 |
| 2,569,009 | Kuempel | Sept. 25, 1951 |
| 2,608,066 | Kirkpatrick | Aug. 26, 1952 |